Jan. 27, 1970 TAKEO YAMADA 3,492,623

STRUCTURE OF VARIABLE RESISTANCE USED IN PHOTOELECTRIC EXPOSURE METER FOR CAMERAS

Filed July 27, 1967

3,492,623
Patented Jan. 27, 1970

3,492,623

STRUCTURE OF VARIABLE RESISTANCE USED IN PHOTOELECTRIC EXPOSURE METER FOR CAMERAS

Takeo Yamada, Yohga-machi, Tokyo, Japan, assignor to Nippon Kogaku K.K., Tokyo, Japan, a corporation of Japan Filed July 27, 1967, Ser. No. 656,510
Claims priority, application Japan, Aug. 5, 1966, 41/51,046
Int. Cl. H01c *5/02, 7/00*
U.S. Cl. 338—162 3 Claims

ABSTRACT OF THE DISCLOSURE

This invention relates to a variable resistance used in photoelectric exposure meters for cameras. The variable resistance of the invention comprises a conductive body and a resistance element connected to the conductive body, the connecting portion of the conductive body and the resistance element being so devised that before a brush slidable on the surface of the variable resistor reaches the connecting border of the conductive body and the resistance element, the brush will contact with the conductive body and the resistance element simultaneously and in parallel, whereby a correct exposure value is obtained.

This invention relates to a variable resistance used in photoelectric exposure meters for cameras.

In accordance with the prior art, it was usual to simply connect a conductive body and a resistance element and an exposure value can be measured by the change in the distance from the joint portion of the conductive body and the resistance element to a moving brush slidable along the surface of the resistance. With such structure of the prior art, the values of resistance at the respective points within the range of measurement are varied almost linearly and consequently the indicator of the galvanometer correctly shows the proper exposure values. However, it does not correctly indicate the proper exposure values in the vicinity of the junction of the conductive body and the resistance element by the reason hereinafter described.

Therefore, the object of the present invention is to present a resistance in which the junction of the conductive body and the resistance element is improved in such a manner that the moving terminal or brush will contact both the conductive body and the resistance element simultaneously and in parallel before the brush reaches the connecting border of the conductive body and the resistance element.

The above and other objects and advantages of the present invention will be more apparent from the following description with respect to the embodiments shown in the drawing in which:

FIGS. 6 and 7 are plan views, while FIG. 8 is side view, respectively.

FIG. 1 shows a circuit for the photoelectric exposure meter for cameras, in which B is cell, C is conductor, D is photoconductive body to receive light rays, M is galvanometer, R is variable resistance for calculating exposure value, and R*g* is fixed resistance for galvanometer.

Figure 1:
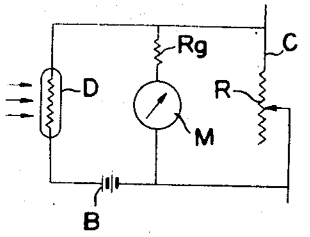
FIG. 1 shows a circuit for the photoelectric exposure meter in which a variable resistance is equipped.
Figure 2:
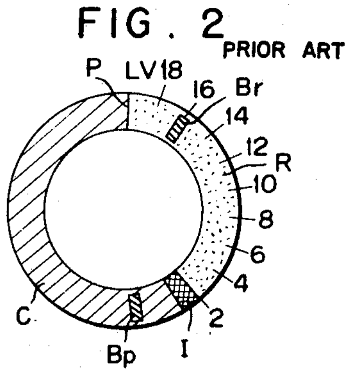
FIG. 2 PRIOR ART
FIG. 2 shows a plan view of a variable resistance according to prior art.
Figure 3:
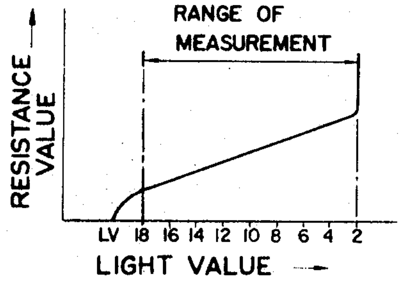
FIG. 3 PRIOR ART
FIG. 3 shows a graph of measured resistance values versus light values using the variable resistance of FIG. 2.

FIG. 2 shows a variable resistance R is to be used in said circuit of FIG. 1 and made in accordance with prior art. In FIG. 2, C is conductive body to be connected at point P with the variable resistance R, B*p* and B*r* are movable brushes, the relative distance therebetween being definite while they move, and I is isolator sandwiched between the conductive body and the resistance element at the least light value expressed by numerical value 2, the width and length of the isolator I being broader and larger than those of the brushes. Numerical value 2 to 18 shown in FIG. 2 are light values to show the range of measurement of light values of usual cameras. When movable brush B*r* locates at a position as shown in FIG. 2, the resistance value obtained thereat will be the light value of 16. The resistance values and the corresponding light values are shown in the graph of FIG. 3. As shown in FIG. 3, in accordance with the prior art typically shown in FIG. 2, the resistance values vary approximately linearly within the range of measurement. However, the resistance value decreases steadily along with a curve to zero as shown at the left side of the graph of FIG. 3. In other words, at the outside of the range of measurement in the vicinity of the maximum light value, i.e. the connecting point P of the conductive body and resistance element, the resistance value decreases gradually to zero, and consequently, the indication of the indicator of the galvanometer at this portion would not indicate the correct exposure value. Further, at this portion, the indicator of the galvanomenter still moves so that when there is provided no signal indicating that the indicator locating outside the measurement range, a user is mislead as if the indicator were properly actuated and misread an erroneous indicating value. In the vicinity of the minimum light value 2, there is provided with insulator I so that when movable brush B*r* contacts with the insulator I, which has broader width and longer length than the brush B*r* has, the resistance value will abruptly increase to infinity.

As explained, in the variable resistance of prior art, at the low resistance side, i.e. the side of light value 18, the indicator still shows a certain resistance value when the brush moves beyond the range of measurement so that the user is misled as if he could still photometering at a range out of the range of measurement, while at the high resistance value, i.e. the side of light value 2, the resistance value is abruptly increased to infinity when the brush moves beyond the position of light value 2 and thereafter the resistance value is decreased to zero by contacting the brush with the conductive body.

According to the preferred embodiment of the present invention, when the moving brush moves to a position just beyond either the minimum resistance point, e.g. LV 18, or the maximum resistance point, e.g. LV 2, the resistance value will be abruptly decreased to zero, with the result that the user can always rely on the indications of the indicator of the galvanometer.

Figure 4:
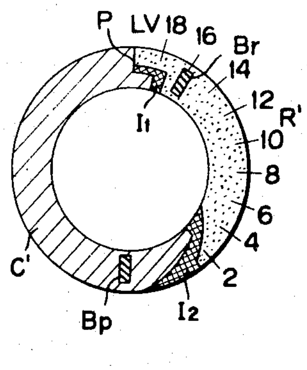
FIG. 4 shows a plan view of an embodiment of the present invention where variable resistance is ring shaped.
Figure 5:
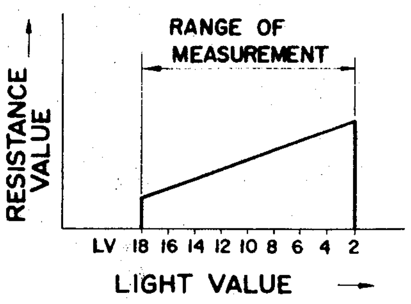
FIG. 5 shows a graph of measured resistance values versus light values using the variable resistance of FIG. 4.

Now referring to FIG. 4, which shows an embodiment of the invention formed in a ring shape, each end of the conductor C′ and the resistance element R′ are connected to be partially parallel to each other with the insulator $I_1$ being sandwiched therebetween. As shown in FIG. 4, in the vicinity of the connecting point P, a part of the end of the conductive body is connected to a part of the end of the resistance element and the remaining part of the end of the conductive body is extended to a position approximately coinciding with the first measuring point, e.g. light value 18, of the resistance element so that, at this extended position, the movable brush Br contacts simultaneously with both conductive body and resistance element. The width of the insulator $I_1$ at the portion of the light value 18 is made broader than the width of the brush Br so that, when the brush comes to contact with this portion of the isolator $I_1$, the brush contacts only with the resistance element and the indicator indicates the correct value for light value 18. As the brush further moves to the left in FIG. 4 it contacts also with the conductive body so that the resistance value abruptly decreases to zero. Further, in the vicinity of the end portion of measurement of the resistance element, e.g. light value 2, the resistance element R′ and conductive body C′ is made partially in parallel as the end measure point, e.g. light value 2, as its center, and $I_2$ is an insulator to separate the conductive body and the resistance element. It is added that the variable resistance is electrically constructed such that appropriate resistance values are obtained, respectively, in correspondence with the respective measuring points, e.g. light values 18 through 2.

Figure 6:
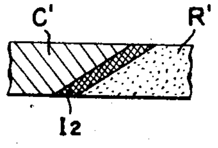
FIGS. 6 through 8 show other embodiments of the strip-like variable resistance of the present invention, respectively.
Figure 7:
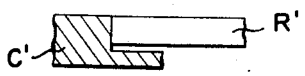
Figure 8:
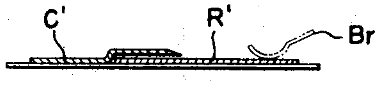

With the arrangement as shown in FIG. 4, when the moving brush Br comes into contact with the first or end measuring point, e.g. light value 18 or 2, it contacts simultaneously with the conductive body C′ and the resistance element R′, so that at either point, the resistance value abruptly decreases to zero and the indicator of the galvanometer M stops its movement. The construction of the variable resistance of the present invention is not limited to the embodiment of FIG. 4, but other modifications may be made within the scope of the invention to provide a moving brush which will simultaneously and in parallel contact the resistance element and conductive body. In FIG. 4, the variable resistance is formed in ring shape, while FIG. 6 shows the connection end of both elements C′ and R′, which are formed in strip shape instead of ring shape, where the conductive body C′ and resistance element R′ are obliquely connected with the insulator $I_2$ being inserted therebetween. FIG. 7 shows a structure in case of that the width of the resistance element R′ is significantly narrow, and in this case the width of the conductive body C′ is made broad and a portion of the end of the conductive body is extended to form the extension to be parallel with the resistance element R′. FIG. 7 as well as FIG. 4 show that, at the connecting portions, conductive body C′ and resistance element R′ are plainly connected in parallel, however, FIG. 8 shows that connecting portion is connected in parallel and in three dimensional. In FIG. 8, the end of the resistance element R′ is connected to the conductive body C′, but the conductive body C′ is overlapped on the resistance element R′, and the overlapped portion forms the parallel connecting end under isolated state.

As explained in the foregoing, in accordance with the present invention, the index of the galvanometer always shows zero position when it moves to a portion out of the range of measurement and therefore the user can correctly identify the situation in which the exposure meter is not functioning. This is true in either point, i.e. the first or end measuring point.

What is claimed is:

1. A variable resistor for a photoelectric exposure meter comprising; a resistance strip; a conducting strip connected with one end of the resistance strip, said conducting strip having one portion connected directly with one end of the resistance strip and another portion extending parallel with and isolated from the resistance strip to a position corresponding to the end of the predetermined range of measurement of exposure value; and a pair of moving terminals in which a first terminal is slidable on the surface of the resistance strip and the surface of the extending portion of the conducting strip, and a second terminal is slidable on the surface of the conducting strip; a resistance value being obtained successively in accordance with distance between the connecting portion of said two strips and the contact position of the first terminal and the resistance strip until the first terminal reaches the end of the extending portion of the conducting strip and then decreases abruptly to zero when the first terminal contacts thereto.

2. A variable resistor according to claim 1, further comprising an isolator inserted between said parallel extended portion of the conductor strip and the corresponding portion of the resistance strip.

3. A variable resistor according to claim 2, wherein a pair of said two strips forms one ring circle in which the one ends of said two strips are connected directly and the other ends thereof are connected in parallel and isolated from each other through an isolator.

References Cited

UNITED STATES PATENTS

| | | | |
|---|---|---|---|
| 1,881,446 | 10/1932 | Flanzer | 338—162 |
| 2,134,870 | 11/1938 | Fruth | 338—162 X |
| 2,570,968 | 10/1951 | Muller | 338—202 X |

LEWIS H. MYERS, Primary Examiner

A. T. GRIMLEY, Assistant Examiner

U.S. Cl. X.R.

338—308